(12) United States Patent
Ohnishi

(10) Patent No.: US 8,400,672 B2
(45) Date of Patent: Mar. 19, 2013

(54) IMAGE PROCESSING APPARATUS

(75) Inventor: Kazuyuki Ohnishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1219 days.

(21) Appl. No.: 12/009,976

(22) Filed: Jan. 23, 2008

(65) Prior Publication Data

US 2008/0174833 A1 Jul. 24, 2008

(30) Foreign Application Priority Data

Jan. 23, 2007 (JP) ................................ 2007-012338

(51) Int. Cl.
  *H04N 1/00* (2006.01)
  *H04N 1/40* (2006.01)
  *H04N 1/387* (2006.01)
  *H04N 1/04* (2006.01)
  *G06K 9/36* (2006.01)

(52) U.S. Cl. ............ 358/1.6; 358/1.2; 358/1.5; 358/1.9; 358/3.23; 358/3.28; 358/505; 358/538; 358/450; 358/453; 358/474; 382/284

(58) Field of Classification Search .................... 358/1.6, 358/1.2, 1.5, 1.9, 3.23, 3.28, 505, 538, 450, 358/453, 474; 382/284
See application file for complete search history.

(56) References Cited

U.S. PATENT DOCUMENTS

| | | | | |
|---|---|---|---|---|
| 5,166,809 A | * | 11/1992 | Surbrook | 358/1.9 |
| 5,218,670 A | * | 6/1993 | Sodek et al. | 358/1.16 |
| 5,381,248 A | * | 1/1995 | Ikeda et al. | 358/538 |
| 5,386,301 A | * | 1/1995 | Yuasa et al. | 358/445 |
| 6,043,899 A | * | 3/2000 | Morohashi et al. | 358/1.18 |
| 6,236,417 B1 | * | 5/2001 | Fujii et al. | 347/129 |
| 6,377,626 B1 | * | 4/2002 | Hatabu | 375/240.1 |
| 6,714,322 B1 | * | 3/2004 | Minamino | 358/3.06 |
| 7,712,858 B2 | * | 5/2010 | Morimoto et al. | 347/15 |
| 2002/0159656 A1 | * | 10/2002 | Matsuki et al. | 382/305 |
| 2004/0036924 A1 | * | 2/2004 | Ihara | 358/3.28 |
| 2004/0062575 A1 | * | 4/2004 | Funamizu et al. | 399/301 |
| 2006/0055980 A1 | * | 3/2006 | Takahashi et al. | 358/3.03 |
| 2006/0238834 A1 | * | 10/2006 | Ozawa et al. | 358/521 |

FOREIGN PATENT DOCUMENTS

| | | |
|---|---|---|
| JP | 07-023208 | 1/1995 |
| JP | 2002-027232 | 1/2002 |
| JP | 2002-330276 | 11/2002 |
| JP | 2003-241956 | 8/2003 |

* cited by examiner

*Primary Examiner* — King Poon
*Assistant Examiner* — Beniyam Menberu
(74) *Attorney, Agent, or Firm* — Edwards Wildman Palmer LLP; David G. Conlin; Stephen D. LeBarron

(57) ABSTRACT

The present invention provides specific image adding section for adding the specific image to inputted image data includes a first counter for deciding positions of a main scanning direction and a vertical scanning direction and a second counter for specifying a form of the specific image. The second counter counts up addresses of pixels with a starting point at one corner on a matrix made up of the main scanning direction and vertical scanning direction. If the first counter counts a predetermined count value, the second counter starts. When a maximum value of the count value of the second counter is equal to or less than a count set value, an image is formed on each of the pixels. The pixel on which the image is formed is changed and the form of the specific image is also changed by changing the count set value.

9 Claims, 6 Drawing Sheets

FIG. 5
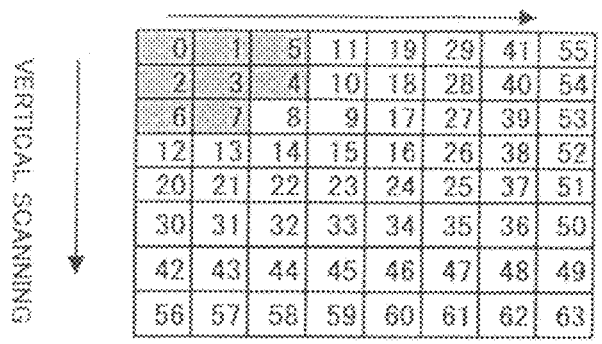
FIG. 6
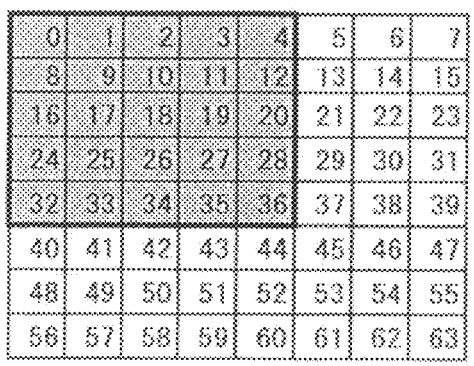
FIG. 8
| ADDR | DATA (CONCENTRATION) |
|---|---|
| 0 | 10 |
| 1 | 10 |
| 2 | 10 |
| 3 | 30 |
| 4 | 10 |
| 5 | 10 |
| 6 | 10 |
| 7 | 10 |
| 8 | 10 |

FIG. 7

IMAGE PROCESSING APPARATUS

BACKGROUND OF THE INVENTION

1. Field of the Invention

The present invention relates to an image processing apparatus which adds a specific image representing regulatory information for regulating processing such as copying or tracking information indicating an output source and performs printing.

2. Description of the Related Art

An image processing apparatus has image data inputted by reading an image of a document or receiving the image data from a personal computer. And the image data is outputted by being printed on a recording sheet. In this case, a specific image is synthesized with the image data so as to print the image having the specific image added.

The specific image is an image which represents regulatory information for regulating processing such as copy inhibition. If the specific image is detected from the inputted image data in the case of copying the document or reading the image data from the document and transmitting the data to the personal computer, the processing to be executed is regulated, such as the copy inhibition or inhibition of data transmission. It is thereby possible to prevent unauthorized use of the image processing apparatus and also prevent leakage of confidential data. When the specific image is an image which represents tracking information, the image processing apparatus which has outputted the image data can be identified by detecting the specific image.

The image data preset as the specific image is stored in memory of the image processing apparatus. The image data is read out and is synthesized with the inputted image data so as to add the specific image to the original image. It is described in Japanese Patent Laid-Open No. 7-23208 that the specific image is thus stored in the memory.

However, the memory is used as bit map memory for storing the specific image, and so large-capacity memory is required. Thus, according to Japanese Patent Laid-Open No. 2002-27232, a pattern generation rule for generating a pattern to be synthesized is stored, and the pattern is generated with the pattern generation rule, a count value of a pixel counter and a count value of a line counter so as to output the pattern.

If the pattern generation rule is utilized as above, the memory for storing the pattern is no longer necessary. In the case of adding a set specific image, the pattern generation rule may be utilized. In the case of changing the specific image, however, the pattern generation rule is changed by operating an operation panel. In this case, it is required to change a bit to be selected by a selector, image concentration to be set by a distributor, selection timing of the distributor by the selector and the like.

Thus, the specific image can be changed but it is not easy to do so. In view of the problem, an object of the present invention is to provide an image processing apparatus which can easily change the specific image.

SUMMARY OF THE INVENTION

The present invention is an image processing apparatus which adds a specific image to inputted image data and performs printing. The image processing apparatus includes a first counter for deciding positions of a main scanning direction and a vertical scanning direction, a second counter for specifying a form of the specific image, a synthesis section for generating the specific image and synthesizing the specific image with the original image by using the second counter when a count value of the first counter becomes a predetermined value, and a change section for changing the form of the specific image by changing a count set value for the second counter.

The predetermined value is the count value of the first counter corresponding to the position where the specific image is to be added. If the count value of the first counter becomes the predetermined value, the second counter starts. Each time the second counter counts up, the synthesis section generates the specific image until the count value of the second counter reaches the count set value. The specific image thus generated is synthesized with the original image and added.

To be more specific, the second counter continuously counts, and the form of the specific image is set based on a predetermined count set value. The change section changes the count set value so that the form of the specific image to be generated is changed. The specific image is made up of dots which are formed by multiple pixels vertically and horizontally lining in sequence. The synthesis section places multiple specific images on an entire recording sheet at predetermined intervals. Each time the predetermined value corresponding to the position of each individual specific image is reached, the second counter starts so that the specific image in the same form is generated.

The second counter has addresses set so as to count up clockwise or counterclockwise with a starting point at one point on a matrix made up of the main scanning direction and vertical scanning direction. The one point may be a corner or one point in an arbitrary position.

The synthesis section compares the count value of the second counter with the count set value thereof as to each individual pixel so as to form the dot on the pixel corresponding to the count value equal to or less than the count set value. The image is formed on the same number of pixels as the count set value, and one dot is formed by multiple pixels. Therefore, if the count set value is changed by the change section, the pixels to have the dot formed thereon are changed so that the form of the specific image changes.

The change section individually sets concentration of the multiple pixels making up the specific image and thereby changes the concentration of the specific image. A look-up table for setting the concentration is provided, where the addresses of the second counter match with the addresses of the look-up table. The change section sets the concentration as to each individual address of the look-up table. The synthesis section refers to the look-up table and decides the concentration of the image to be formed.

According to the present invention, the form of the specific image can be set by setting the count set value according to the second counter. For that reason, the form of the specific image can be easily changed just by changing the count set value. Memory is provided as a table for setting the concentration, which is associated with the addresses of the second counter. Thus, memory management becomes easier, and it is also easy to change the concentration of arbitrary pixels making up the specific image.

BRIEF DESCRIPTION OF THE DRAWINGS

FIG. 5 is a diagram showing placement of addresses on a second counter;

FIG. 6 is a diagram showing the placement of addresses on a conventional counter;

FIG. 7 is a diagram for explaining configuration of the second counter; and

FIG. 8 is a diagram showing a look-up table for setting concentration.

DETAILED DESCRIPTION OF THE PREFERRED EMBODIMENTS

Figure 1:
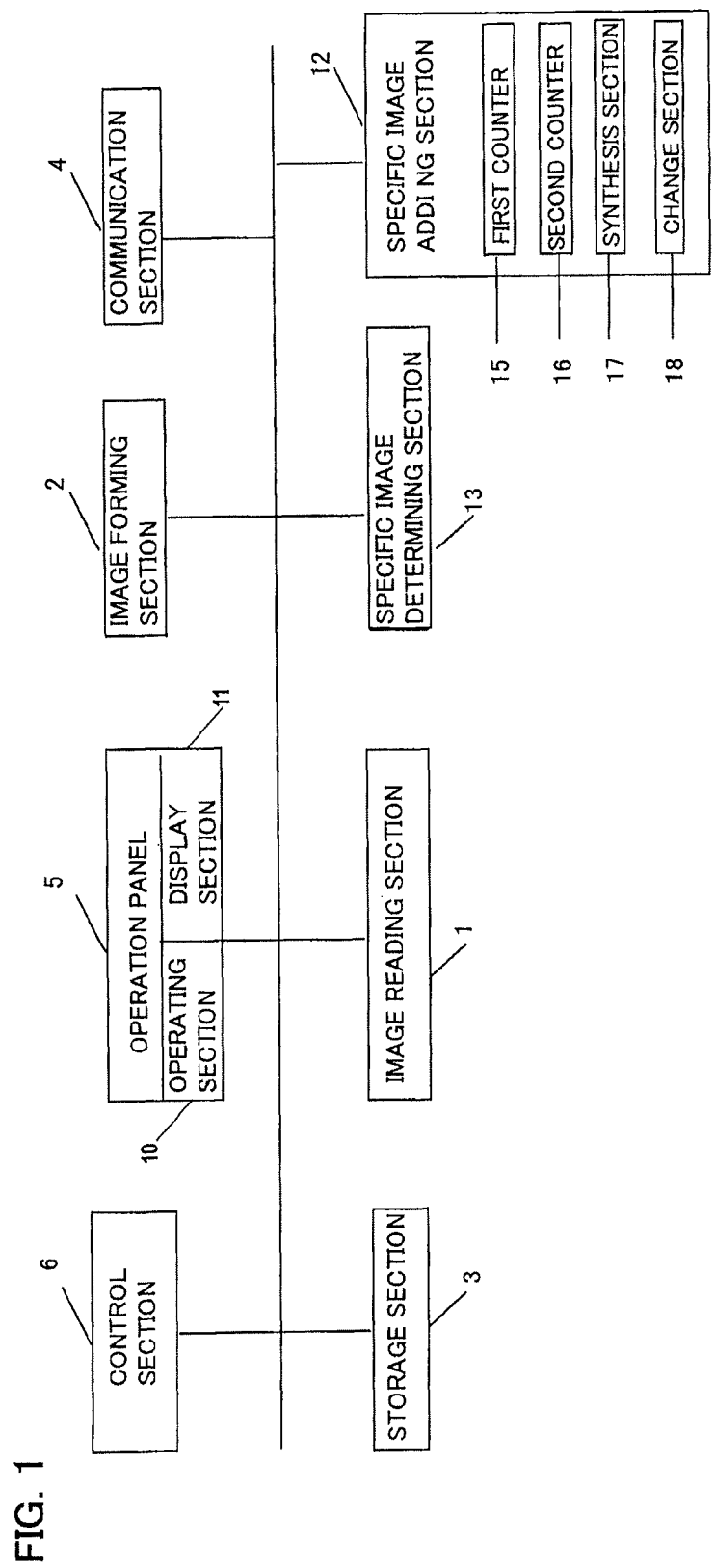
FIG. 1 is a schematic block diagram of an image processing apparatus of the present invention.

FIG. 1 shows an image processing apparatus according to this embodiment. The image processing apparatus is a composite machine performing a copy mode, a print mode, a scanner mode and a facsimile mode. The image processing apparatus includes an image reading section 1 for reading a document and inputting image data, an image forming section 2 for printing an image based on the image data, a storage section 3 for storing the image data, a communication section 4 for performing communication with an external apparatus, an operation panel 5 for input operations, and a control section 6 for controlling a processing section and processing the image data according to a mode. The processing section processes inputted image data in order to output it, and includes the image forming section 2, the storage section 3 and the communication section 4.

The operation panel 5 includes an operating section 10 and a display section 11. The operating section 10 includes various operation keys. The display section 11 is made up of a liquid crystal display, which is a touch-panel. The image forming section 2 is provided with a laser scanning unit (LSU), an electrophotographic process section and a recording sheet feeding section, and prints the image based on the inputted image data on a fed recording sheet.

The communication section 4 includes a communication interface, which is connected to a network such as a LAN or a WAN. The network is connected to external apparatuses which are other image processing apparatuses, information processing apparatuses such as personal computers, and servers. The communication section 4 can perform communication with the external apparatuses by a predetermined communication protocol through the network.

The communication section 4 also includes a modem apparatus. The modem apparatus is connected with a telephone line. The image processing apparatus can perform facsimile communication. The image processing apparatus can also perform data communication by an Internet facsimile through the network.

The storage section 3 is composed of a hard disk drive. The storage section 3 stores the image data inputted from the image reading section 1 or the image data inputted from the communication section 4. The inputted image data is once stored in an image memory such as a DRAM, undergoes image processing and encryption processing and is then transferred to the storage section 3 from the image memory. When reading the image data from the storage section 3, the image data undergoes the image processing and decryption processing and is then stored in the image memory. After that, the image data is outputted to outside by printing, data communication and facsimile communication according to an executed process.

The storage section 3 includes a management table. The management table stores the necessary information for operating the image processing apparatus, such as control information and setting information on the image processing apparatus and authentication information on a user. If such information is created or changed, the information of the management table is updated. The management table may also be provided to a nonvolatile memory other than the storage section 3.

The control section 6 is composed of a microcomputer including a CPU, a ROM and a RAM, where the CPU reads a control program stored in the ROM to the RAM so as to execute the control program. Each of the sections operates according to the control program.

To be more specific, if the image data is inputted from the image reading section 1 or the communication section 4, one of the print mode, copy mode, scanner mode and facsimile mode is executed based on processing conditions included in input information from the operating section 10 and header information of the image data inputted from the external apparatus. Moreover, the control program includes a browser and mail software so that the control section 6 performs the data communication with the external apparatus and transmits and receives e-mail by the communication protocol such as a TCP/IP protocol.

The control section 6 temporarily stores the inputted image data in the storage section 3 when performing each of the modes. The control section 6 also executes a filing mode for storing and managing the inputted image data in the storage section 3. The stored image data is outputted again according to a designated process.

The outputted image data is erased from the storage section 3 according to an instruction from the control section 6. On the erasure, the image data is invalidated so as not to be restorable by overwriting the image data with random data. Thus, the invalidation processing is performed and the encryption processing is further performed so as to prevent unauthorized use of the image data.

Here, to prevent a confidential document from being unauthorizedly copied or facsimile-transmitted, a specific image is added to the document. The specific image represents regulatory information for regulating the processes to be executed, such as copy inhibition, lowering of printed image quality, inhibition of data transmission and facsimile transmission and filing inhibition. The specific image may also represent tracking information identifying the image processing apparatus as an output source.

A specific image adding section 12 for adding the specific image is provided. The specific image adding section 12 has its operation controlled by the control section 6 and generates the specific image based on set adding conditions so as to synthesize the specific image with the image data. The control section 6 performs the processing such as printing, data transmission and filing of the synthesized image data.

The adding conditions on the specific image are stored in the management table in advance. The adding conditions include forms, image forming conditions, number and positions of the specific images. The specific image adding section 12 reads the adding conditions and generates the specific image based on the adding conditions so as to synthesize the specific image with the inputted image data.

Figure 2:
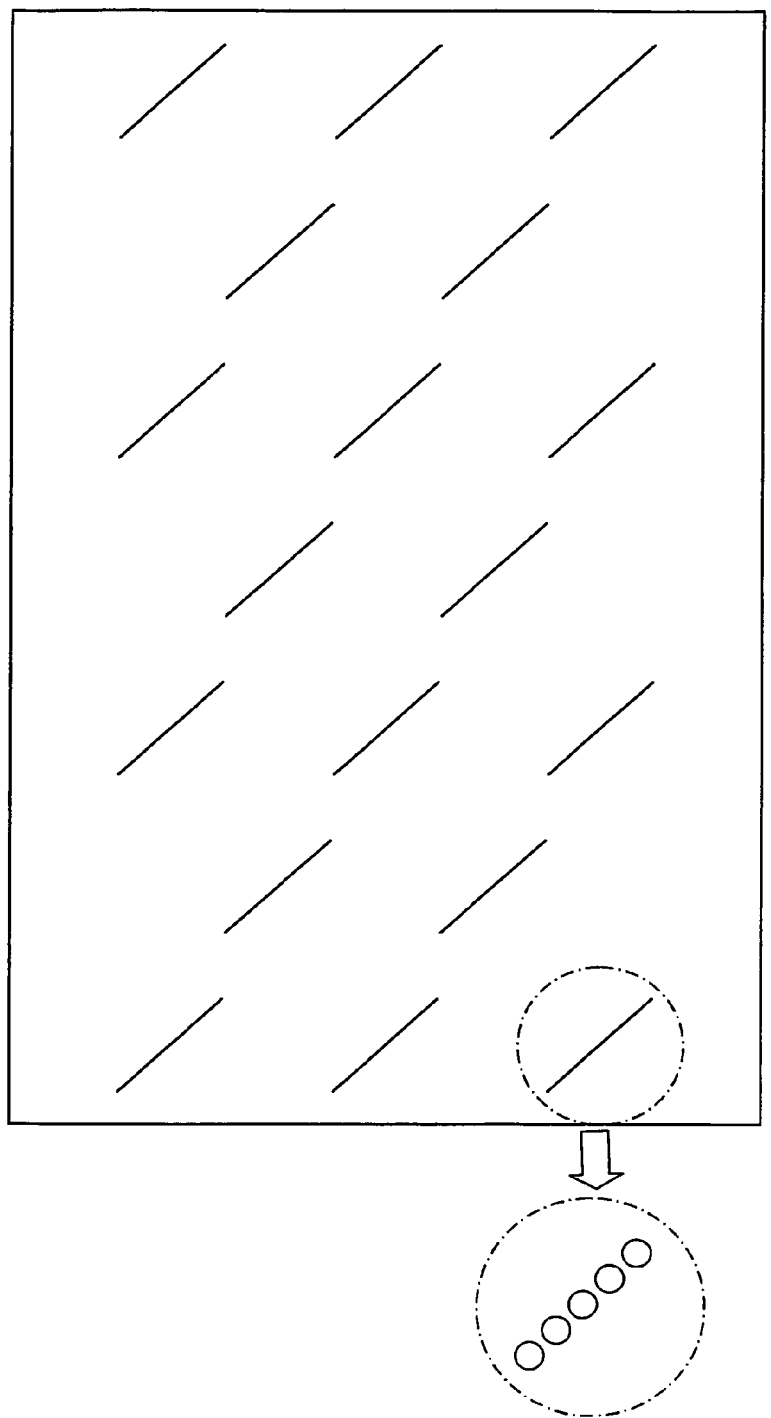
FIG. 2 is a diagram showing a document including a specific image.

If the image data having the specific image added is printed, a document including the specific image as shown in FIG. 2 is created. The specific image is a predetermined image, which is in the form having a pattern of multiple dots linearly lining and inclining for instance. The specific images in the same form are regularly placed in predetermined positions. Multiple specific images are included in one-page document. The number of the specific images per page is set according to page size. The concentration of the specific image and an angle of the inclining pattern are also set. The angle is 45 degrees.

The image data including the specific image is data-transmitted through the communication section 4. If the image data is printed on the image processing apparatus which has received the image data, the document including the specific image is created.

The specific image of the document is hardly visible to human eye. However, the specific image can be read by the image reading section 1. Given this factor, a specific image determining section 13 is provided, which detects whether or not the specific image is included in the image data and determines whether or not the specific image has exceeded a threshold. The image data is not limited to that inputted from the image reading section 1, but is also inputted from the external apparatus through the communication section 4.

The specific image determining section 13 has its operation controlled by the control section 6 and detects the specific image by pattern-matching the inputted image data with the image data corresponding to the specific image. The image data corresponding to the specific image is registered in advance and stored in the management table. And the specific image determining section 13 counts the number of the detected specific images, and determines whether or not the number of the detected specific images has exceeded the threshold. In the case where the image data is in units of pages, the number of the specific images is calculated as to each page. Or else, the number of the specific images in a predetermined area dimension is calculated.

The threshold is set by an authorized user such as a manager, and is stored in the management table. The authorized user is authenticated by inputting authentication information such as a password or biologic information including fingerprints. The authenticated user can set the threshold through the operating section 10.

In the case where the specific images are included in the inputted image data by exceeding the threshold, the control section 6 regulates the processes to be executed. To be more specific, the control section 6 provides an instruction of copy inhibition when in the copy mode, and provides an instruction of transmission inhibition when in the facsimile mode or the scanner mode. When in the filing mode, the control section 6 provides an instruction to inhibit storage of the image data in the storage section 3. In the case where the specific images are detected but the number thereof do not exceed the threshold, the control section 6 does not regulate the processes.

Thus, the image processing apparatus adds and detects the specific images, and thereby performs security measures for preventing the unauthorized use of the image processing apparatus and protecting the image data.

Here, there are the cases where the dots are not stably formed by the image processing apparatus due to characteristics of the electrophotographic process, time degradation or the like. For that reason, the control section 6 measures the processing characteristics by exerting process control. And the control section 6 changes size of the dots or changes concentration of the dots according to the result. The specific images are consequently changed.

Figure 3:
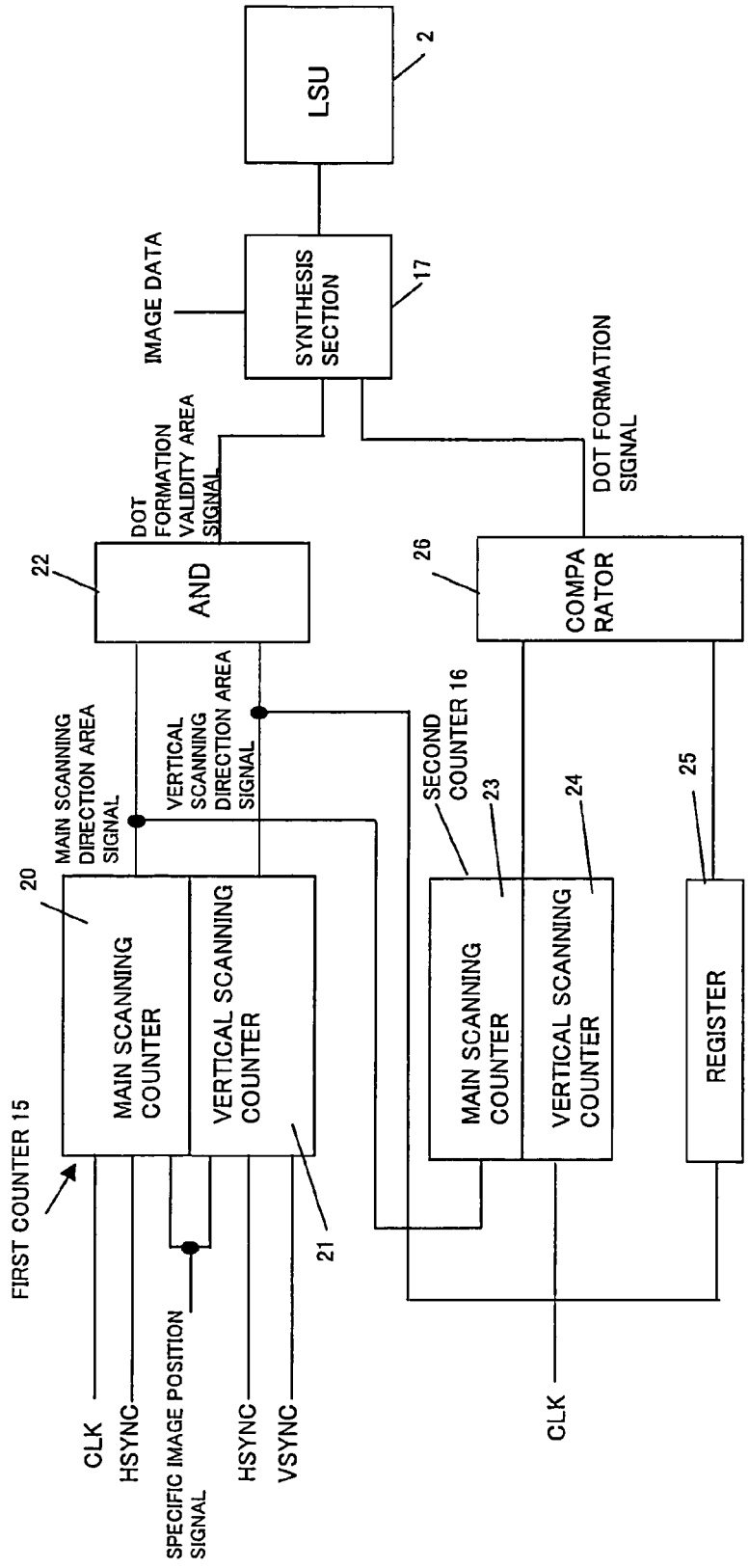
FIG. 3 is a schematic block diagram of a specific image adding section.

The image processing apparatus has the specific image adding section 12 constituted so that the specific images can be easily changed. As shown in FIG. 3, the specific image adding section 12 includes a first counter 15 for deciding positions of a main scanning direction and a vertical scanning direction, a second counter 16 for specifying the form of the specific image, a synthesis section 17 for generating the specific image and synthesizing the specific image with the original image by using the second counter 16 when a count value of the first counter 15 becomes a predetermined value, and a change section 18 for changing the form of the specific image by changing a count set value for the second counter.

Figure 4:
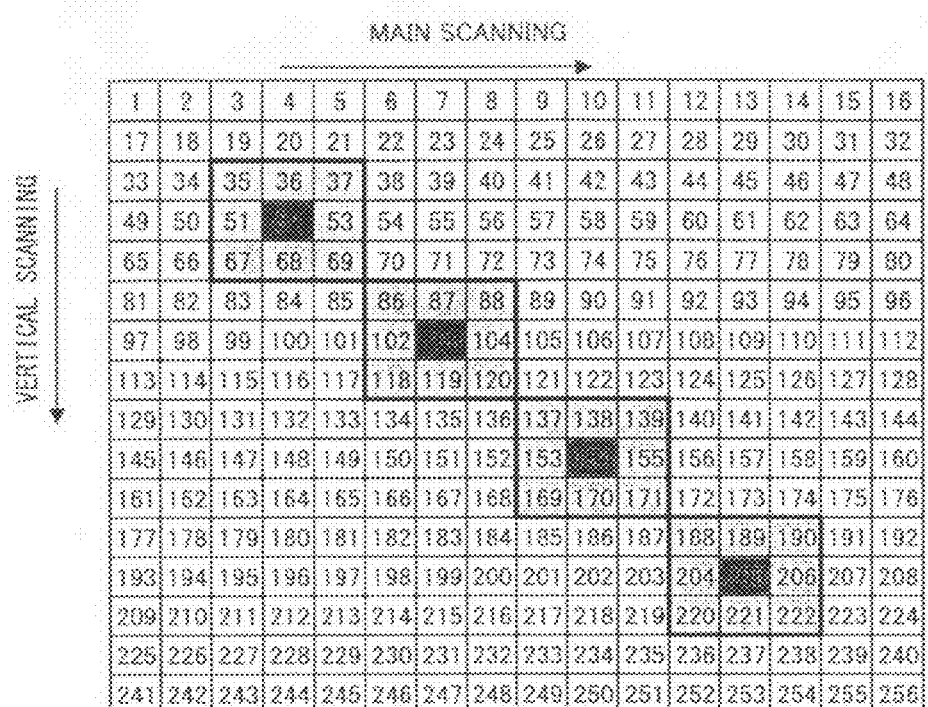
FIG. 4 is a diagram showing addresses of the specific image on a first counter.

Multiple pixels are arranged like a matrix in the main scanning direction and vertical scanning direction in a predetermined area which is normally one page. And the specific images are added as shown in FIG. 4. The form of the specific image is a pattern in which multiple dots of 3×3 pixels are obliquely arranged.

The first counter 15 is made up of a main scanning counter 20 and a vertical scanning counter 21, and counts up by +1 per line in the main scanning direction in sequence while counting up to be the last count value of the preceding line +1 in the vertical scanning direction based on a pixel clock signal. In this case, a horizontal synchronizing signal (HSYNC), a vertical synchronizing signal (VSYNC) and a specific image position signal are inputted so as to output area signals for deciding the area to have the specific images added. The control section 6 outputs each of the signals. The specific image position signal is decided based on position information in the adding conditions.

The area signals are outputted from the main scanning counter 20 and the vertical scanning counter 21 respectively. A main scanning direction area signal from the main scanning counter 20 and a vertical scanning direction area signal from the vertical scanning counter 21 are inputted to an AND circuit 22. When an AND of the two signals is 1, a dot formation validity area signal is outputted. When the AND is 0, the dot formation validity area signal is not outputted. A forming position of the dots making up the specific image is decided per line by the dot formation validity area signal.

The main scanning direction area signal and the vertical scanning direction area signal are inputted to the second counter 16. In the case of adding the specific images as shown in FIG. 4, the area signals are inputted to the second counter 16 when the addresses 35, 86, 137 and 188 of the first counter 15 are counted.

The second counter 16 is a counter which has addresses set so as to count up clockwise or counterclockwise with a starting point at one corner on a matrix made up of the main scanning direction and vertical scanning direction. Here, as shown in FIG. 5, the second counter 16 counts up counterclockwise with the starting point at one corner at the upper left. As shown in FIG. 6, a conventional counter has the addresses set so as to count up by +1 per line in the main scanning direction.

Figure 7:
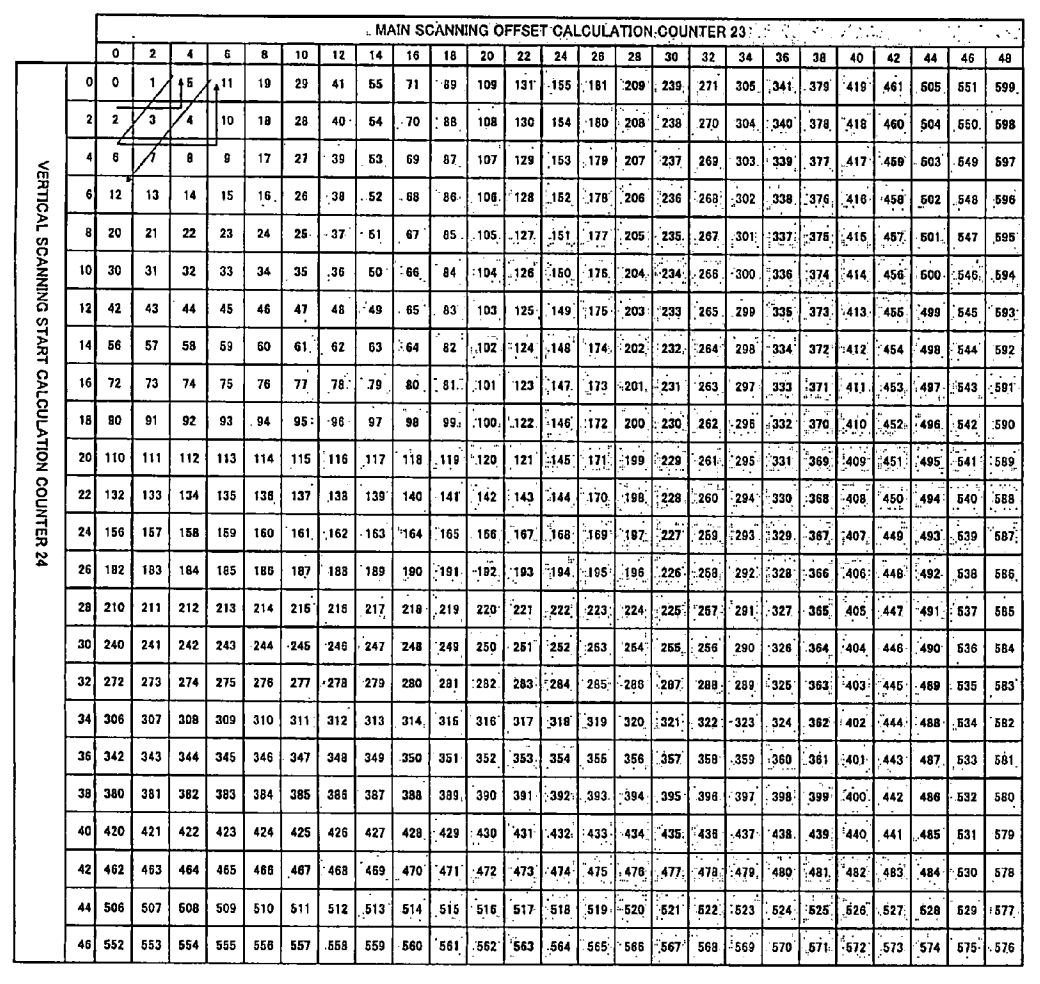

To be more precise, the second counter 16 includes a main scanning offset calculation counter 23 and a vertical scanning start calculation counter 24 as shown in FIG. 7. The vertical scanning start calculation counter 24 calculates a start value of each of the lines. The count value of the counter 24 starts with 0 and increases by +2, such as 2, 4 and 6. The start value of each of the lines is Start value of preceding line+Count value. For instance, the start value of the fourth line is 6+6=12.

The main scanning offset calculation counter 23 calculates an offset of each of the pixels. The count value of the counter 23 starts with 0 and increases by +2, such as 2, 4 and 6. In the case where Current main scanning count value>Current vertical scanning count value is NO, the count value of the next pixel is Current count value+1. In the case of YES, the count value of the next pixel is Current count value+Next main scanning count value. For instance, in the case where the current count value is 33, it is 6>10 which is NO and so the count value of the next pixel is 33+1=34. In the case where the current count value is 36, it is 12>10 which is YES and so the count value of the next pixel is 36+14=50.

The second counter 16 has the pixel clock signal as well as the main scanning direction area signal and the vertical scanning direction area signal from the first counter 15 inputted thereto. When the AND of the main scanning direction area signal and the vertical scanning direction area signal is 1, the second counter 16 starts and outputs the count value as to each of the pixels. For instance, the second counter 16 outputs the count values 0, 1, 5, 11 and so on in the first one line and 2, 3, 4, 10 and so on in the next line. When the AND is 0, the second counter 16 does not operate.

As shown in FIG. 3, a register 25 for deciding the form of the specific image is provided. The count set value is registered with the register 25 based on the adding conditions. A comparator 26 makes a comparison between the count value and the count set value of the second counter 16. The comparator 26 compares the size of the count value and the count set value, and outputs a dot formation signal when the count value is equal to or smaller than the count set value. The dot formation signal is not outputted when the count value is larger than the count set value. The image is formed on a pertinent pixel by the dot formation signal according to the adding conditions. The image is formed as to each of the lines based on outputs of the first counter 15 and the second counter 16. The dots making up the specific image are formed by multiple images formed as to each of the lines. The dots are in a rectangular form of n×n pixels.

In the case of the dots of 3×3 pixels for instance, the addresses of the second counter 16 become consecutive count values, such as 0 to 8. In this case, the count set value becomes 8. In the case of the dots of 4×4 pixels, the addresses become 0 to 15, and the count set value becomes 15. In the case of the dots of 5×5 pixels, the addresses become 0 to 24, and the count set value becomes 24.

In the case of the conventional counter shown in FIG. 6, there are discontinuous addresses of 0 to 2, 8 to 10 and 16 to 18 to the dots of 3×3 pixels. The count set values equivalent to the addresses must be registered with the register. A larger amount of memory is used, and memory management becomes complicated. In comparison, when the second counter 16 is utilized, the memory management is easy because only one count set value has to be stored.

The dot formation signal from the comparator 26, the dot formation validity area signal from the first counter 15 and the inputted image data are inputted to the synthesis section 17. The synthesis section 17 synthesizes the image data with the image data due to the dot formation signal so as to generate an image signal as to each of the pixels. The image signal is outputted to the image forming section 2. In the image forming section 2, the laser writing unit scans a photoreceptor according to the image signal. Thus, the image is printed on the recording sheet.

If the count value of the first counter 15 becomes the predetermined value set in the adding conditions, the dot formation validity area signal is outputted. The second counter 16 operates with reference to the pixel which is pertinent to the count value so that the specific image in a predetermined form is generated and is added to the original image.

The change section 18 changes the count set value registered with the register 25. The control section 6 decides and changes the count set value based on a measurement result of process control. Or else, the user may change the count set value by operating the operating section 10 and inputting the set value. Moreover, the user who can change the count set value is an authenticated user such as a manager.

The output of the dot formation signal from the comparator 26 is changed by the change of the count set value. Therefore, the size of the specific image is changed by the change of the pixels by which the image is formed as the specific image.

The change section 18 changes the concentration of the specific image. The concentration is set as to each of the multiple pixels making up the specific image. The change section 18 changes the set concentration. As shown in FIG. 8, a look-up table for setting the concentration is provided. The look-up table is made up of a RAM, where concentration data is stored at the addresses corresponding to the addresses of the second counter 16 respectively. Therefore, a maximum value of the addresses of the look-up table is the same as the number of pixels of one dot for the specific image so that memory usage is low.

When changing the concentration, the concentration data is inputted through the operating section 10. The control section 6 rewrites the concentration data of the look-up table. When the dot formation signal is inputted, the synthesis section 17 refers to the look-up table and reads the concentration data of the pertinent address. And the synthesis section 17 generates the image signal of the set concentration as to each of the pixels. Thus, the concentration of the specific image can be easily changed.

The present invention is not limited to the embodiment, and many modifications and changes may be made to the embodiment within the scope of the invention. The second counter may also count up clockwise with the starting point at one corner at the lower right. Use of the second counter is suited when forming rectangular dots at an arbitrary corner in the predetermined area. The form of the dots making up the specific image is not limited to square but may also be rectangular. The second counter may also count up clockwise or counterclockwise with the starting point at the center of the predetermined area. In this case, circular dots can be formed.

What is claimed is:

1. An image processing apparatus for adding a specific image made up of dots which are formed by multiple pixels to image data and performing printing and for, when specific images are included in the inputted image data, regulating the processes to be executed based on the inputted image data, comprising:
    a first counter for deciding positions of a main scanning direction and a vertical scanning direction;
    a second counter for specifying a form of the specific image based on the count value of the second counter;
    a synthesis section for, if the count value of the first counter becomes a predetermined value, comparing the count value of the second counter with the count set value of the second counter thereof as to each individual pixel so as to form the dot on the pixel corresponding to the count value of the second counter equal to or less than the count set value and for synthesizing the specific image made up of dots with the original image; and
    a change section for changing the form of the specific image by changing a count set value for the second counter.

2. The image processing apparatus according to claim 1, wherein the synthesis section places multiple specific images on an entire recording sheet at predetermined intervals.

3. The image processing apparatus according to claim 1, wherein the second counter has addresses set so as to count up clockwise or counterclockwise with a starting point at one point on a matrix made up of the main scanning direction and sub scanning direction.

4. The image processing apparatus according to claim 1, wherein the change section individually sets concentration of the multiple pixels making up the specific image and thereby changes the concentration of the specific image.

5. The image processing apparatus according to claim 2, wherein the change section individually sets concentration of the multiple pixels making up the specific image and thereby changes the concentration of the specific image.

6. The image processing apparatus according to claim 3, wherein the change section individually sets concentration of the multiple pixels making up the specific image and thereby changes the concentration of the specific image.

7. The image processing apparatus according to claim 4, wherein a look-up table for setting the concentration is provided, and addresses of the second counter match with addresses of the look-up table.

8. The image processing apparatus according to claim 5, wherein a look-up table for setting the concentration is provided, and addresses of the second counter match with addresses of the look-up table.

9. The image processing apparatus according to claim 6, wherein a look-up table for setting the concentration is provided, and addresses of the second counter match with addresses of the look-up table.

* * * * *